(12) United States Patent
Moret et al.

(10) Patent No.: US 8,429,403 B2
(45) Date of Patent: Apr. 23, 2013

(54) SYSTEMS AND METHODS FOR PROVISIONING NETWORK DEVICES

(75) Inventors: Eric Moret, San Jose, CA (US); Robert Hubbard, Aptos, CA (US); Kent A. Watsen, Leesburg, VA (US); Muku Murthy, San Jose, CA (US); Nicolas Beauchesne, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 829 days.

(21) Appl. No.: 12/190,103

(22) Filed: Aug. 12, 2008

(65) Prior Publication Data
US 2010/0042834 A1    Feb. 18, 2010

(51) Int. Cl.
H04L 9/32    (2006.01)
(52) U.S. Cl.
USPC ............. 713/168; 713/155; 380/229; 705/67; 726/2
(58) Field of Classification Search .................. 713/168, 713/155; 380/229; 705/67; 726/2
See application file for complete search history.

(56) References Cited

U.S. PATENT DOCUMENTS

| 6,868,160 | B1 | | 3/2005 | Raji | |
|---|---|---|---|---|---|
| 7,089,297 | B1 | * | 8/2006 | Salas et al. | 709/220 |
| 7,240,364 | B1 | * | 7/2007 | Branscomb et al. | 726/9 |
| 7,283,505 | B1 | * | 10/2007 | Meenan et al. | 370/338 |
| 2003/0163713 | A1 | * | 8/2003 | Cocchi et al. | 713/189 |
| 2006/0190575 | A1 | * | 8/2006 | Harvey et al. | 709/222 |
| 2006/0248348 | A1 | * | 11/2006 | Wakao et al. | 713/186 |
| 2008/0235511 | A1 | * | 9/2008 | O'Brien et al. | 713/171 |
| 2010/0017597 | A1 | * | 1/2010 | Chandwani | 713/156 |

FOREIGN PATENT DOCUMENTS

| CA | 2 571 891 | 6/2008 |
|---|---|---|
| WO | WO 2007/042345 A1 | 4/2007 |

OTHER PUBLICATIONS

Anupam Gupta; Provisioning a Virtual Private Network: A Network Design Problem for Multicommodity Flow; ACM; Year:2001; pp. 1-21.*
European Search Report, corresponding to EP 09 25 1947, mailed Nov. 10, 2009, 8 pages.
A. Menezes et al., "Handbook of Applied Cryptography, Passage", CRC Press LLC, Jan. 1997, pp. 496-566, XP002378900.

* cited by examiner

*Primary Examiner* — April Shan
(74) *Attorney, Agent, or Firm* — Harrity & Harrity, LLP

(57) ABSTRACT

A method performed by a network device may include generating and storing a first public key and a first private key in a first device, transmitting a serial number and the first public key from the first device to a second device, generating, by the second device, a second public key and a second private key, transmitting the second public key from the second device to the first device and transmitting the serial number, the first public key, the second public key and the second private key to a third device, establishing and authenticating a connection between the first device and the third device using the first public key and the second public key and transmitting encrypted configuration information with the two key pairs from the third device to the first device.

15 Claims, 4 Drawing Sheets

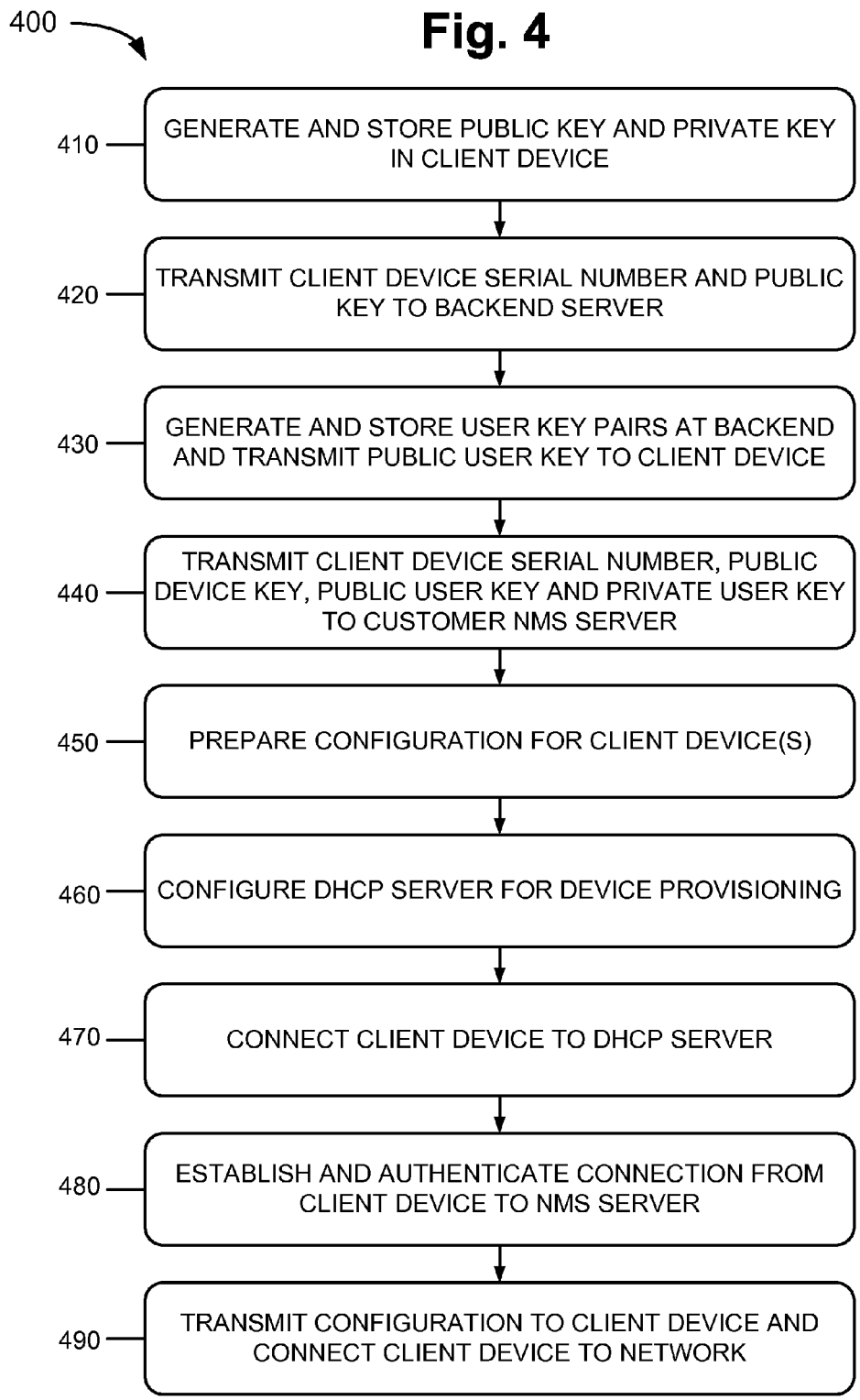

SYSTEMS AND METHODS FOR PROVISIONING NETWORK DEVICES

BACKGROUND INFORMATION

After purchasing network devices, each network device must be provisioned with configuration information used to connect the device to the customer's network. Commonly, there are a variety of methods of providing a network device with the necessary and/or required configuration information used to connect the network device to a network. One of the drawbacks to these methods is that the initial connection of the network device to the customer's network involves a non-secure and unprotected network connection. A solution is needed that allows network management systems to establish secure network connections to provision newly connected network devices.

BRIEF DESCRIPTION OF THE DRAWINGS

Reference is made to the attached drawings, wherein elements having the same reference number designation may represent like elements throughout.

FIG. 4 is a flow diagram illustrating an exemplary provisioning process.

DETAILED DESCRIPTION OF PREFERRED EMBODIMENTS

The following detailed description refers to the accompanying drawings. The same reference numbers in different drawings identify the same or similar elements. Also, the following detailed description does not limit the systems and methods described herein. Instead, the scope of the systems and methods are defined by the appended claims and equivalents.

Figure 1:
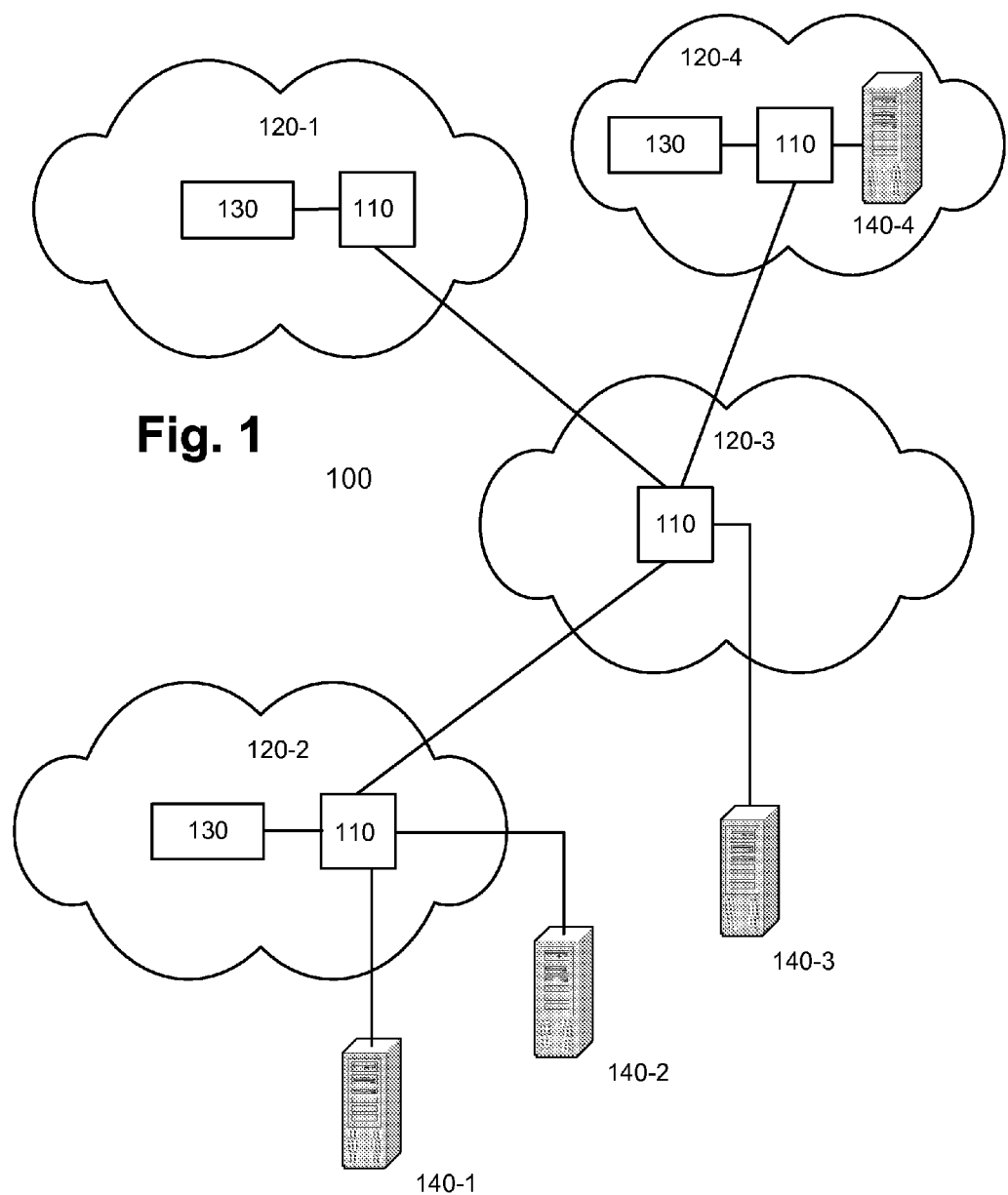
FIG. 1 is a diagram of an exemplary system in which methods and systems described herein may be implemented.

FIG. 1 is a diagram of an exemplary system 100 in which methods and systems described herein may be implemented. System 100 may include routers 110 (hereinafter collectively referred to as routers 110), networks 120-1 to 120-4 (hereinafter collectively referred to as networks 120), client devices 130 and servers 140-1 to 140-4 (hereinafter collectively referred to as servers 140). It should be understood that system 100 may include any number of additional devices and/or networks.

Routers 110 may include devices for performing network-related functions. For example, each of routers 110 may include a switch and/or logic for receiving and forwarding data from another router 110, client device 130 and/or server 140, to a different router 110, client device 130 and/or server 140.

Networks 120 may include one or more networks or sub-networks including an Internet Protocol (IP) network, a telephone network, such as the Public Switched Telephone Network (PSTN), a wide area network (WAN), a local area network (LAN) or a metropolitan area network (MAN). Networks 120 may also include a modem or an Ethernet interface, for example. Routers 110, client devices 130 and servers 140 may communicate over networks 120 using, for example IP Protocols. Networks 120 may also include devices such as switches, routers, firewalls, gateways, and/or servers (not shown) to transmit/receive and route data to/from the connected network devices. Networks 120 may be a hardwired network using wired conductors and/or optical fibers and/or may be a wireless network using free-space optical and/or radio frequency (RF) transmission paths. Implementations of networks 120 and/or devices operating in networks 120 described herein are not limited to communicating via any particular data type, and/or protocol. Networks 120-1 and 120-2 may be referred to as "customer networks." For example, network 120-1 may be owned and operated by "customer A" and network 120-2 may be owned and operated by "customer B," where customer A and customer B purchase equipment (e.g., client devices 130) from a vendor. Network 120-3 may be referred to as a "backend network," which may be owned and operated by a vendor of, for example, client devices 130 and/or hardware and/or software associated with client devices 130. Network 120-4 may be owned and operated by a manufacturer of client devices 130, for example.

Client devices 130 may include one or more processors or microprocessors enabled by software programs to perform functions, such as data storage and transmission, data streaming and interfacing with other client devices 130, servers 140 and/or networks 120. Client devices 130 may include end user devices that may transmit and/or receive data over one or more networks, such as for example, a set top box, a personal computer, a workstation, a laptop computer, a Smartphone, a cellular phone or a personal digital assistant (PDA). Client devices 130 may also include devices used to route data, such as routers, switches and gateways, for example. Client devices 130 may include software to enable communications over networks 120 and/or other networks, such as the Internet. Client devices 130 may also include a data storage memory, such as a random access memory (RAM) or another dynamic storage device that stores information. Client devices 130 may also include one or more input devices, such as a keyboard for entering data, a mouse for selecting data or pointing to data, and one or more output devices, such as display or monitor for outputting information to a user.

Servers 140 may include one or more processors, microprocessors or other processing logic enabled by software programs to perform functions, such as data storage and transmission and interface with client devices 130, for example. Servers 140 may also include a data storage memory, such as a random access memory (RAM) or another dynamic storage device that stores provisioning and configuration information, as described in detail below. Servers 140 may also include a communication interface that may include any transceiver-like mechanism that enables servers 140 to communicate with other devices and/or systems. In addition, servers 140 may include other mechanisms for communicating data via a network, such as a wireless network, for example. In one example, server 140-1 may be configured as a dynamic host configuration protocol (DHCP) server and server 140-2 may be configured as a network management system (NMS) server, within or coupled to network 120-2.

Figure 2:
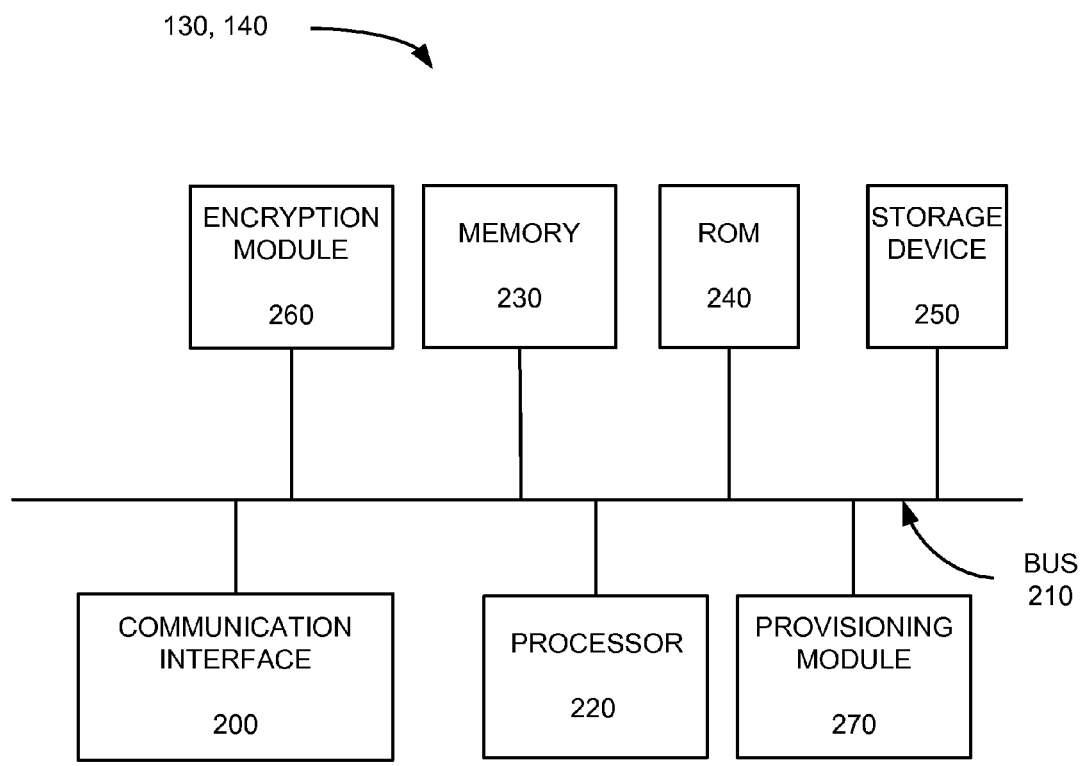
FIG. 2 is a diagram of the exemplary network devices shown in FIG. 1.

FIG. 2 is a diagram of an exemplary configuration of components within client devices 130 and servers 140. Client devices 130 and servers 140 may include communication interface 200, bus 210, processor 220, memory 230, read only memory (ROM) 240, storage device 250, encryption module 260 and provisioning module 270. Bus 210 permits communication among the components of client devices 130 and servers 140. Client devices 130 and servers 140 may also include one or more power supplies (not shown). One skilled in the art would recognize that client devices 130 and servers 140 may be configured in a number of other ways and may include other or different elements.

Communication interface 200 may include communication mechanisms that enable client devices 130 and servers 140 to communicate with other devices and/or systems. For example, communication interface 200 may include a modem or an Ethernet interface to a WAN or LAN. In addition, communication interface 200 may include other mechanisms for communicating via a network, such as a wireless network. Communication interface 200 may also include transmitters/receivers for communicating data to/from other client devices 130 and servers 140, for example.

Processor 220 may include any type of processor, microprocessor, application specific integrated circuit (ASIC), field programmable gate array (FPGA), and/or logic that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Encryption module 260 may include memories for storing one or more encryption/decryption programs. For example, an encryption program within encryption module 260 may modify data before transmission from one of client devices 130 and/or servers 140 to another device. A decryption program within encryption module 260 may decrypt received data from one of client devices 130 and/or servers 140.

Provisioning module 270 may include logic and one or more memories to store information to provision and/or configure client devices 130. Provisioning module 270 may also include logic and/or programs used to transmit/receive information and data to/from client devices 130 and servers 140, for example. An exemplary provisioning module 270 that may be included in client devices 130 and servers 140 is described below with reference to FIG. 3.

According to an exemplary implementation, client devices 130 and servers 140 may perform various processes in response to processor 220 executing sequences of instructions contained in memory 230 and/or provisioning module 270. Such instructions may be read into memory 230 and/or provisioning module 270 from another computer-readable medium, such as storage device 250, or from a separate device via communication interface 200. It should be understood that a computer-readable medium may include one or more memory devices. Execution of the sequences of instructions contained in memory 230 and/or provisioning module 270 causes processor 220 to perform the acts that will be described hereafter. In alternative embodiments, hard-wired circuitry may be used in place of or in combination with software instructions to implement aspects of the embodiments. Thus, the systems and methods described are not limited to any specific combination of hardware circuitry and software.

Figure 3:
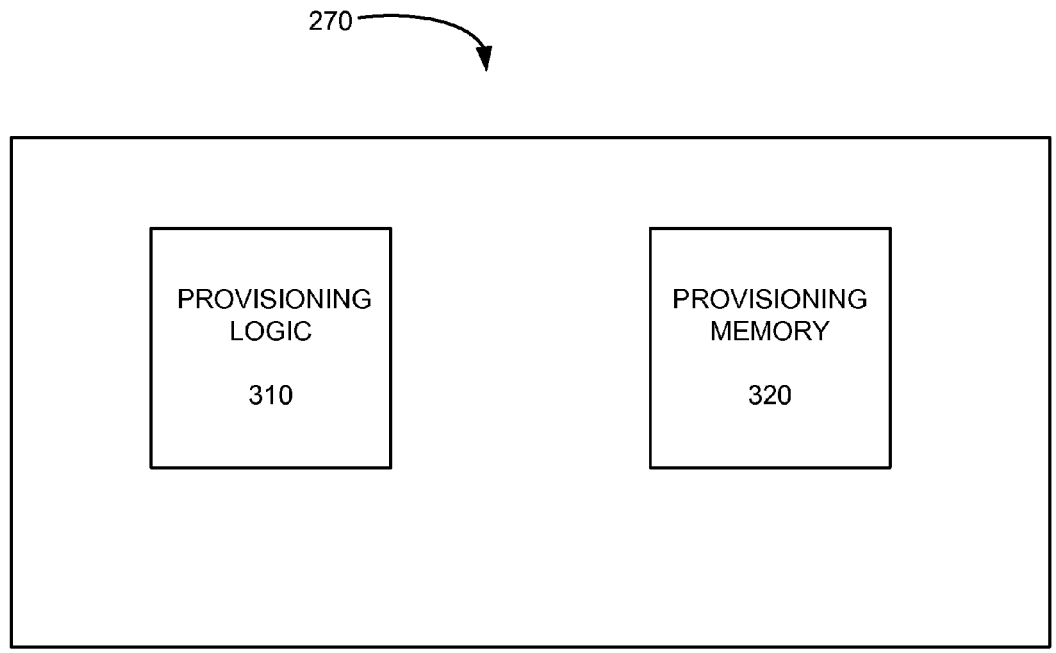
FIG. 3 is a diagram of an exemplary provisioning module within the network devices shown in FIG. 1.

FIG. 3 is a diagram of exemplary components of provisioning module 270 within client devices 130 and servers 140. As shown in FIG. 3, provisioning module 270 may include provisioning logic 310 and provisioning memory 320. In one example, provisioning module 270 may be included within a tamper proof device and may be referred to as a Trusted Platform Module (TPM). For example, provisioning module 270 may be included within a tamper proof area within processor 220, or may be located externally to processor 220 and included within a separate tamper proof device (as shown in FIG. 2).

Provisioning logic 310 may be, for example, implemented in processor 220 and may include hardware and software for controlling device provisioning processes. For example, provisioning logic 310 may include a RAM, ROM, and/or another type of memory used to store device provisioning software applications. For example, a device provisioning software application contained in provisioning logic 310 may include instructions for instigating or initiating a device provisioning process which may include instructions for generating, storing and transmitting encryption keys. In one implementation, provisioning logic 310 included in a client device 130 may create public and private keys and store the keys in provisioning memory 320. Provisioning logic 310 included in a client device 130 may also transmit a serial number and public key to one of servers 140. Provisioning logic 310 included in one of servers 140, may receive and store (in provisioning memory 320) a serial number of a client device 130 with an associated received public key from the client device 130. Provisioning logic 310 included in one of servers 140 may also include logic to create another public key from a received serial number of a client device and to store the created public key in provisioning memory 320 with the associated serial number and previously received public key from a client device 130. Provisioning logic 310 included in one of servers 140 may also include logic to transmit (to another one of servers 140) a received serial number of a client device with an associated public key.

Provisioning memory 320 may include logic and one or more memories for receiving and storing data. For example, provisioning memory 320 may receive and store a client device serial number and store received encryption keys associated with the serial number. In one implementation, provisioning memory 320 included in one of client devices 130 may receive and store a serial number, a public device key, a private device key and a public user key. Provisioning memory 320 included in one of servers 140 may store a number of client device serial numbers and associated encryption keys, for example.

FIG. 4 illustrates an exemplary provisioning process 400. Processing may begin by generating a public device key and a private device key within the client device 130 (block 410). For example, upon completion of manufacturing the client device 130, provisioning logic 310 (included within client device 130) may access encryption module 260 in order to generate a public device key and a private device key (block 410). The generated public device key and private device key may then be stored in provisioning memory 320, within client device 130, for example. The generated public device key and serial number may also be transmitted from the client device 130 to server 140-4, which may be associated with the manufacturer of client devices 130, along with the client device serial number, to be stored in provisioning memory 320, within server 140-4, for example. After generating public and private device keys within client device 130, the public device key and a serial number of the client device 130 may be transmitted to a backend network (block 420). For example, a manufacturer's server 140-4 or the client device 130 may transmit the serial number of the client device 130 and the client device's public device key to a backend network server 140-3 (block 420).

Server 140-3 may generate and store a user key pair (block 430). For example, server 140-3 may access an encryption program within encryption module 260 that generates a user key pair that includes a private user key and a public user key. The serial number of the client device 130 may then be associated and stored with the user key pairs in provisioning memory 320 within server 140-3. For example, server 140-3 may store for each client device 130, a serial number, a public user key, a private user key and a public device key. Server 140-3 may then transmit the public user key it created back to client device 130 (block 430). In this manner, each client device 130 may store in provisioning memory 320, a serial number, a public device key, a private device key and a public user key.

After generation and storage of user key pairs in the back-end network 120-3, the client device serial number, the public device key, the private user key and public user key may be transmitted to a customer network 120-2 (block 440). For example, "customer B," that operates network 120-2, may have purchased a number of client devices 130 from the vendor associated with network 120-3. The serial number of each purchased client device 130 along with an associated public user key, private user key and public device key is transmitted from server 140-3 to server 140-2 within network 120-2 (block 440). Each received device serial number and associated keys (public user key, private user key and public device key) may then be stored and indexed based on serial numbers within provisioning memory 320 of server 140-2. It should be understood that for scalability purposes, purchased client devices 130 may be shipped from the vendor or manufacturer's location directly to the customer location.

Server 140-2 may then prepare configuration information for each client device 130 (block 450). For example, configuration information may include firmware configurations, security policies/applications, licenses, service applications, layer 2 (L2) and layer 3 (L3) virtual private network (VPN) information, IP addresses, HTTP parameters and/or any information needed or required by each client device 130 to operate on network 120-2. The information and applications included within configuration information may depend on the type of client device 130. For example, if client device 130 is a mobile device, such as a cellular phone or Smartphone, the configuration information may include email addresses for servers 140 within network 120-2. Configuration information may also include ring-tone information, if for example, client device 130 is a cellular or Smartphone. If client device 130 is a router (such as router 110), the configuration information may include data routing information such as one or more routing tables, for example.

After configuration information has been generated for each client device 130 by server 140-2, server 140-1 may be configured for client device provisioning (block 460). As described above, server 140-2 may have previously received and stored (in block 440) a number of client device serial numbers associated with client devices 130 that will be connected to network 120-2. These serial numbers may be transmitted from server 140-2 to server 140-1(block 460). Additionally, server 140-1 may be configured with, for example, DHCP protocol option 60, which includes "class identifier" information (block 460). After configuring server 140-1, when a client device 130 connects to network 120-2 for the first time, it may connect to server 140-1 using DHCP protocols (block 470). For example, discovery, offer, request and acknowledge messages in accordance with DHCP protocols may be transmitted to/from client device 130 to server 140-1. Additionally, information transmitted from client device 130 includes some type of class identifier information, such as for example, class identifier=SZT, which may be received and verified by server 140-1 (block 470). Included in these DHCP messages, server 140-1 may transmit an IP address to be assigned to the client device 130 and may transmit host information, a port number and an IP address of a network management server, such as server 140-2 to client device 130 (block 470). For example, the IP address assigned to client device 130 and the IP address of server 140-2 may be transmitted from server 140-1 via option 43 of DHCP protocols.

After receiving an IP address of server 140-2, client device 130 may establish and authenticate a connection with server 140-2 (block 480). For example, using the serial number of client device 130 and public user keys, stored within both client device 130 and server 140-2, a mutual authentication may be performed (block 480). For example, server 140-2 may verify that the serial number received from client device 130 is valid and may verify that encrypted messages transmitted between both client device 130 and server 140-2 may be correctly decrypted using stored (respectively in both the client device 130 and server 140-2) private device key and private user key. After the establishing and authenticating the connection, configuration information may be transmitted to client device 130 and client device 130 may be connected to a network (block 490). For example, the configuration information (generated in block 450) may be encrypted and transmitted from server 140-2 to client device 130 (block 490). If, for example, client device 130 is a computer, configuration information may include VPN information, IP addresses, HTTP parameters and/or any other information needed or required by the computer (i.e. device 130) to operate on network 120-2. After reception, client device 130 may decrypt and store the configuration information transmitted from server 140-2. The client device 130 may then be re-started, and using the received and stored configuration information, be connected to network 120-2 (block 490). In this manner, configuration information may be provided to client deice 130 from a remote location in a secure manner.

It should be understood that blocks within process 400 may be simultaneously performed for a number of client devices 130. For example, server 140-2 may prepare configuration information for a first client device 130 (block 450), while simultaneously establishing a connection with a second client device 130 (block 480), while also simultaneously transmitting configuration information to a third client device 130 (block 490). Thus, large numbers of client devices 130 may be connected to a network 120 and may be automatically and securely provisioned.

CONCLUSION

Implementations consistent with the systems and methods described herein may securely provision large numbers of network devices connected to a network. The systems and methods described herein may also reduce network resources required for network device provisioning processes.

The foregoing description of the embodiments provides illustration and description, but is not intended to be restrictive or to limit implementations to the precise form disclosed. Modifications, additions and variations are possible in light of the above teachings without departing from the broader scope of the embodiments as set forth in the claims that follow.

For example, the embodiments have been described in the context of client devices 130 and servers 140 transmitting data over communications networks 120. The embodiments described herein may be implemented in other devices or systems and/or networks.

Further, while series of acts have been described with respect to FIG. 4, the order of the acts may be varied in other implementations. Moreover, non-dependent acts may be performed in parallel.

It will also be apparent that aspects of the implementations, as described above, may be implemented in cellular communication devices/systems, methods, and/or computer program products. Accordingly, the implementations may be embodied in hardware and/or in software (including firmware, resident software, micro-code, etc.). Furthermore, the implementations may take the form of a computer program product on a computer-usable or computer-readable storage medium having computer-usable or computer-readable program code embodied in the medium for use by or in connection with an instruction execution system. The actual software code or specialized control hardware used to implement aspects of the embodiments is not limiting of the systems and methods described. Thus, the operation and behavior of the aspects were described without reference to the specific software code—it being understood that one would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

No element, act, or instruction used in the description of the present application should be construed as critical or essential to the systems and methods described unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the systems and methods described herein are defined by the claims and their equivalents.

What is claimed is:

1. A method comprising:
    generating, by a first device, a first public key and a first private key,
        the first device being associated with a device identifier;
    transmitting, from the first device to a second device via a first private network and based on the first private key, information that includes the device identifier and the first public key,
    the second device differing from the first device, and
    the second device generating, based on the information, a second public key and a second private key;
    receiving, at the first device and from second device via the first private network, the second public key and the second private key;
    transmitting, from the first device to a third device, the device identifier, the first public key and the second public key,
    the third device differing from the first device and the second device,
    the third device being associated with a second private network that differs from the first private network, and
    third device identifying, based on the device identifier, a device type, of a plurality of different device types, associated with the first device and selecting, based on the identified device type, configuration information that enables the first device to operate on the second private network;
    establishing, by the first device, a secure connection with the third device using the first public key and the second public key;
    receiving, by the first device and via the secure connection, the configuration information from the third device; and
    connecting, by the first device and based on the configuration information, to the second private network.

2. The method of claim 1, where the device identifier includes a serial number and where the method further comprises:
    transmitting the serial number from the second device to the third device.

3. The method of claim 2, where the serial number of the first device is used to establish the secure connection between the first device and the third device.

4. The method of claim 1, where the second device comprises a first server, and where the third device comprises a second server.

5. The method of claim 1, where the first device comprises at least one of:
    a set top box,
    a computer,
    a mobile communication devices, or
    a router.

6. A network device, comprising:
    a memory to store a device identifier associated with the network device, a private key, and a first public key; and
    logic, implemented at least partially in hardware, to:
        transmit, via a first private network, the device identifier and the first public key to a second network device;
        store, in the memory, a second public key received from the second network device,
            the second public key differing from the first public key;
        establish a secure connection with a third network device using the first public key and the second public key,
            the third network device being associated with a second private network that differs from the first private network; and
        receive, from the third network device and via the secure connection, configuration information that enables the network device to operate on the second private network,
            the third device identifying the configuration information based on a device type, of a plurality of device types, associated with the network device.

7. The network device of claim 6, where the second public key is generated by the second network device based on at least one of the device identifier or the first public key.

8. The network device of claim 6, where the logic is further to transmit the private key to the second network device, and where the third network device receives the device identifier, the second public key, the private key, and the first public key from the second network device.

9. The network device of claim 6, where the logic is further to:
    establish a connection with a fourth network device, where the fourth network device provides information to establish the secure connection to the third network device.

10. The network device of claim 9, where the information, provided by the fourth device to establish the secure connection to the third network device, includes an IP address of the third network device.

11. A non-transitory computer-readable medium to store instructions, the instructions comprising:

one or more instructions that, when executed by a processor, cause the processor to:
  store, in a memory, a device identifier associated with the network device, a private key, and a first public key;
  transmit, via a first private network, the device identifier and the first public key to a second network device;
  store, in the memory, a second public key received from the second network device,
    the second public key differing from the first public key;
  establish a secure connection with a third network device using the first public key and the second public key,
    the third network device being associated with a second private network that differs from the first private network; and
  receive, from the third network device and via the secure connection, configuration information that enables the network device to operate on the second private network,
    the third device identifying the configuration information based on a device type, of a plurality of device types, associated with the network device.

12. The non-transitory computer-readable medium of claim 11, where the second public key is generated by the second network device based on at least one of the device identifier or the first public key.

13. The non-transitory computer-readable medium of claim 11, where the instructions further comprise:
  one or more instructions to transmit the private key to the second network device, and
  where the third network device receives the device identifier, the second public key, the private key, and the first public key from the second network device.

14. The non-transitory computer-readable medium of claim 11, where the instructions further comprise:
  one or more instructions to establish a connection with a fourth network device,
    where the fourth network device provides information to establish the secure connection to the third network device.

15. The non-transitory computer-readable medium of claim 14, where the information, provided by the fourth device to establish the secure connection to the third network device, includes an IP address of the third network device.

* * * * *